(12) United States Patent
Cmielowski et al.

(10) Patent No.: US 11,853,392 B2
(45) Date of Patent: Dec. 26, 2023

(54) PROVIDING REDUCED TRAINING DATA FOR TRAINING A MACHINE LEARNING MODEL

(71) Applicant: INTERNATIONAL BUSINESS MACHINES CORPORATION, Armonk, NY (US)

(72) Inventors: Lukasz G Cmielowski, Cracow (PL); Amadeusz Masny, Bialystok (PL); Daniel Jakub Ryszka, Cracow (PL); Wojciech Sobala, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 17/538,361

(22) Filed: Nov. 30, 2021

(65) Prior Publication Data
US 2023/0169148 A1    Jun. 1, 2023

(51) Int. Cl.
*G06F 18/214* (2023.01)
*G06F 18/211* (2023.01)
(Continued)

(52) U.S. Cl.
CPC ........ *G06F 18/2148* (2023.01); *G06F 18/211* (2023.01); *G06F 18/2433* (2023.01)

(58) Field of Classification Search
None
See application file for complete search history.

(56) References Cited

U.S. PATENT DOCUMENTS

2019/0156243 A1    5/2019    Li
2019/0188536 A1    6/2019    Ming
(Continued)

FOREIGN PATENT DOCUMENTS

CN    110520871 A    11/2019
CN    112306623 A    2/2021
(Continued)

OTHER PUBLICATIONS

International Searching Authority, "Notification of Transmittal of the international Search Report and the Written Opinion of the International Searching Authority, or Declaration," Patent Cooperation Treaty, dated Nov. 28, 2022, 7 pages, International Application No. PCT/IB2022/061462.
(Continued)

*Primary Examiner* — Mohammed Rachedine
(74) *Attorney, Agent, or Firm* — Rakesh Roy

(57) ABSTRACT

A method, computer system, and a computer program product for providing reduced training data for training a machine learning model (ML-model) is disclosed. The present invention may include generating the reduced training data dependent on a first two batches of data records of original training data. The present invention may include generating an updated version of the reduced training data dependent on the reduced training data and a further batch of the original training data, wherein a size of the updated version of the reduced training data is equal or less than a size of the limited storage capacity and less than a combined size of the reduced training data and the further batch together. The reading of a further batch of the data records of the original training data and the generating of an updated version of the reduced training data may be repeated.

20 Claims, 11 Drawing Sheets

(51) Int. Cl.
   *G06F 18/2433* (2023.01)
   *G06N 20/00* (2019.01)

(56) References Cited

U.S. PATENT DOCUMENTS

| | | | |
|---|---|---|---|
| 2019/0332933 A1 | 10/2019 | Qiao | |
| 2020/0042362 A1 | 2/2020 | Cui | |
| 2020/0167691 A1 | 5/2020 | Golovin | |
| 2020/0250515 A1 | 8/2020 | Rifkin | |
| 2020/0302304 A1* | 9/2020 | Hu | G06T 1/60 |
| 2020/0372342 A1 | 11/2020 | Nair | |
| 2020/0401948 A1 | 12/2020 | Ma | |
| 2021/0019151 A1 | 1/2021 | Pudipeddi | |
| 2021/0034972 A1 | 2/2021 | Oh | |
| 2021/0035027 A1 | 2/2021 | Santos et al. | |
| 2021/0350239 A1* | 11/2021 | Wang | G06N 20/10 |
| 2022/0343163 A1* | 10/2022 | Takamoto | G06N 3/045 |

FOREIGN PATENT DOCUMENTS

| | | | | |
|---|---|---|---|---|
| CN | 113379064 A | | 9/2021 | |
| CN | 113424207 A | | 9/2021 | |
| CN | 113939829 A | * | 1/2022 | G06F 11/3495 |
| CN | 114427684 A | * | 5/2022 | |
| CN | 111563662 B | * | 9/2022 | G06N 3/0454 |
| CN | 111553415 B | * | 11/2022 | G06K 9/6267 |
| WO | WO-2020114283 A1 | * | 6/2020 | G06F 3/0608 |
| WO | 2020260991 W | | 12/2020 | |

OTHER PUBLICATIONS

Mell et al., "The NIST Definition of Cloud Computing", Recommendations of the National Institute of Standards and Technology, NIST Special Publication 800-145, Sep. 2011, 7 pages.

Binford, "Predictive Early Stopping—A Meta Learning Approach," Towards Data Science, Apr. 22, 2020, 9 pgs. https://towardsdatascience.com/predictive-early-stopping-a-meta-learning-approach-90561f0e9454.

Machine Learning Mastery, "Frequently Asked Questions," Machine Learning Mastery, Making Developers Awesome at Machine Learning, [accessed Nov. 30, 2021], 16 pgs., Retrieved from the Internet: <https://machinelearningmastery.com/faq/single-faq/how-do-i-use-early-stopping-with-k-fold-cross-validation-or-grid-search/>.

* cited by examiner

PROVIDING REDUCED TRAINING DATA FOR TRAINING A MACHINE LEARNING MODEL

BACKGROUND

The invention relates in general to the field of machine learning and, in particular, to a method for providing training data for training a machine learning model (ML-model).

Nowadays, there is a need for ML-models to support modern approaches of transferring data. For example, ML-models may be used to perform a streaming of data. In order to generate ML-models, training data is required. In some cases, potential training data may scale up to terabytes. However, a computer system for training ML-models may have a smaller storage capacity compared to a storage capacity of a server storing the potential training data.

SUMMARY

Embodiments of the present invention disclose a method, computer system, and a computer program product for providing reduced training data comprising data records for training a machine learning model (ML-model). The present invention may include generating the reduced training data dependent on a first two batches of data records of original training data. The present invention may include generating an updated version of the reduced training data dependent on the reduced training data and a further batch of the original training data, wherein a size of the updated version of the reduced training data is equal or less than a size of the limited storage capacity and less than a combined size of the reduced training data and the further batch together. The reading of a further batch of the data records of the original training data and the generating of an updated version of the reduced training data may be repeated. The present invention may also include providing the updated version of the reduced training data for the training of the ML-model, wherein a size of the updated version of the reduced training data is smaller than a size of the original training data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
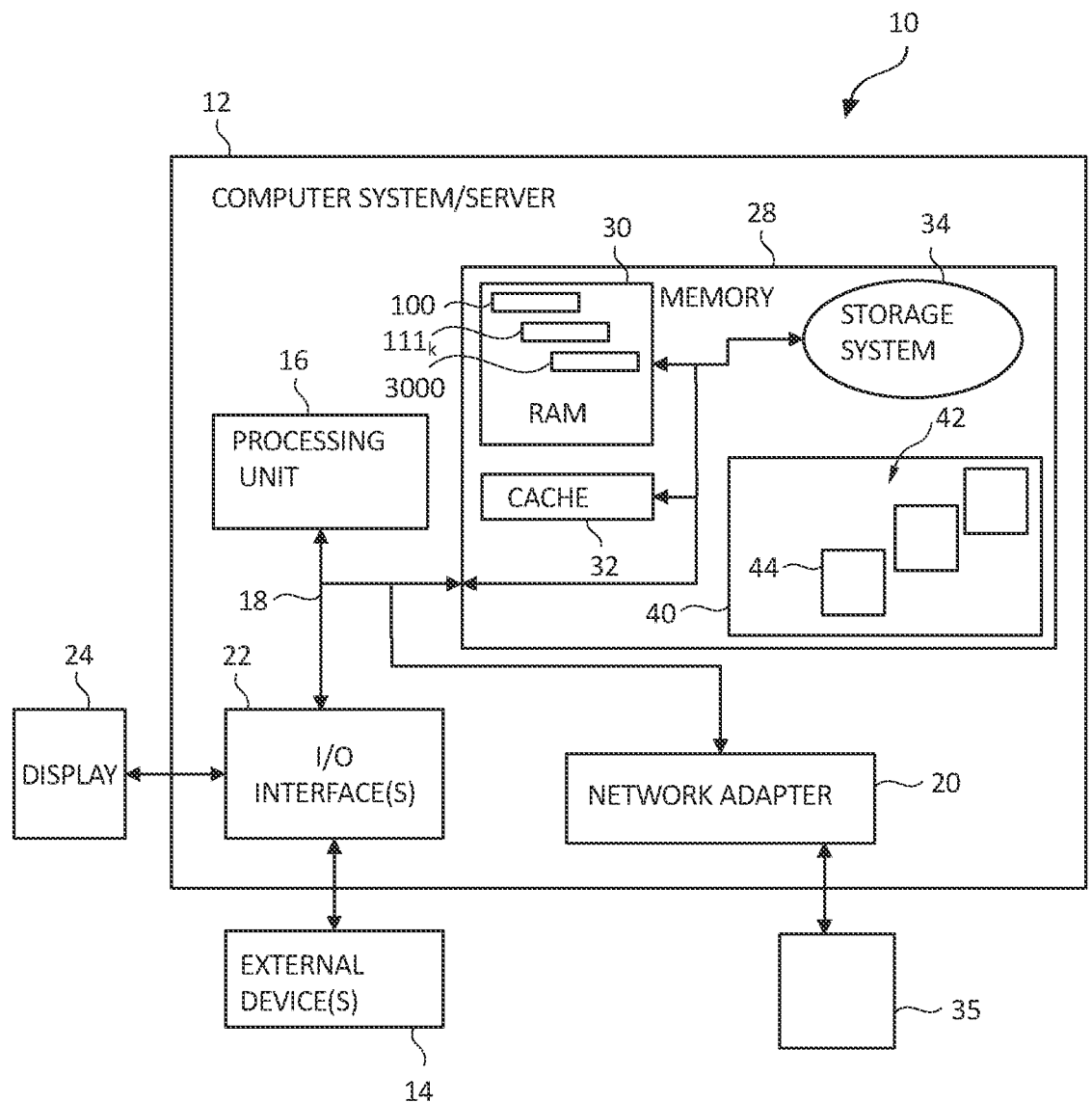
FIG. 1 is a block diagram schematically illustrating a computer system according to at least one embodiment.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The size of the original training data may be more than ten times or even more than one hundred times bigger than the size of the updated version of the reduced training data, in the following also referred to as updated reduced data.

The data records of the original training data may each comprise elements. The respective elements of each data record may each store a respective value of a feature. Hence, each element of each data record may correspond to one feature of several features. In other words, respective data records may each store a respective value of the several features. The several features may comprise input features and at least one target feature of the ML-model. The updated reduced data may serve for training the ML-model such that the trained ML-model may be used for predicting a value of the target feature dependent on a new combination of values of the input features. The new combination of the values of the input features may not be comprised by one of the data records of the original training data.

In one example, the limited storage capacity may be a maximal storage capacity of a volatile storage media of the computing device, which may perform the training of the ML-model, such as a random access memory (RAM), a dynamic RAM (DRAM) or a static RAM (SRAM). Hence, the limited storage capacity may also be a maximal storage capacity of a CPU cache of the computing device, such as an L1-cache or an L2-cache, in one example. In case the limited storage capacity is the maximal storage capacity of the volatile storage media of the computing device, the computing device may store the updated reduced data in the volatile storage media.

In case the volatile storage media is a RAM of the computing device, the proposed method may enable to store all data records of the updated reduced data in the RAM as the size of the updated reduced data is equal or less than the limited storage capacity. This may allow a central processing unit (CPU) of the computing device to access any data record of the updated reduced data from the RAM. As a consequence, the proposed method may provide the updated reduced data such that the computing device may perform a fast training of the ML-model according to which all data records of the updated reduced data are accessible for the CPU.

In another example, the limited storage capacity may be a maximal storage capacity of a non-volatile storage media of the computing device, such as a solid-state drive (SSD), a read-only memory (ROM) or an erasable programmable read-only memory (EPROM or Flash memory).

In the case the limited storage capacity is the maximal storage capacity of the non-volatile storage media of the computing device, the computing device may store the updated reduced data in the non-volatile storage media. In this case, the proposed method may enable the computing device to store all data records of the updated reduced data as the size of the updated reduced data is equal or less than the limited storage capacity. This may allow to perform the training of the ML-model using all data records of the updated reduced data in the first place. In this case, the computing device may load a part of the data records of the updated reduced data from the non-volatile storage media into the volatile storage media, for example the RAM, of the computing device for performing the training of the ML-model using only the part of the data records in a first training session. In a second training session, the computing device may load a further part of the data records of the updated reduced data from the non-volatile storage media into the volatile storage media for performing the training of the ML-model using the further part of the data records.

Generally, the proposed method may be performed by means of the computing device which may also be used for training the ML-model, in the following also referred to as training device. However, the proposed method may also be performed on an external computing device, in the following also referred to as external device. The external device may be located externally from the training device. In this case, the limited storage capacity may be a maximal storage capacity of a volatile or a non-volatile storage media of the external device. Hence, in this case, the proposed method may present a method how to generate the updated reduced data given the limited storage capacity. In this case, a combined size of the first batch and the second batch of the data records may be equal or less than the maximal storage capacity of the volatile or the non-volatile storage media of the external device.

The external device may provide the updated reduced data by sending the updated reduced data from the external device to the training device.

In another example, in case the proposed method is performed on the external device, the maximal storage capacity of the volatile or the non-volatile storage media of the external device may not pose a limit with respect to storing the original training data. In this case, the proposed method may be applied to provide the updated reduced data such that the training of the ML-model is feasible on the training device.

The repeating of the reading of a further batch of the data records of the original training data and of the generating of an updated reduced data may be performed by performing several repetitions of the reading of a further batch of the data records of the original training data and of the generating of an updated version of the reduced data. When performing the repetitions, the reduced data of an actual repetition of the repetitions may be an updated version of the reduced data of a last repetition of the repetitions. Thus, in each repetition a respective updated version of the reduced data may be generated dependent on the updated version of the reduced data of a respective last repetition of the repetitions and a respective further batch of the data records of the original training data.

The repetitions may be performed until a stop criterion is met. In a simple example, the stop criterion may be a time limit. In a further example, the stop criterion may be met if each data record of all the data records of the original training data has been read in the form of the further batch in one of the respective repetitions. In another example, the stop criterion is met if the data records of the updated reduced data fulfill a data metric measure. In one example, the data metric measure may be given in the form of a desired distribution of values of a selected feature of the features represented by the values of the elements of the data records of the updated reduced data.

The original training data may be divided into various batches of the data records of the original training data. When performing the respective repetition of the repetitions, reading the respective further batch during the respective repetition may involve reading one of the various batches of the original training data which has not been read in one of the previous repetitions of the repetitions.

By generating the respective updated version of the reduced data of each repetition dependent on the updated version of the reduced data of the respective last repetition and the respective further batch of the data records of the original training data, the reduced data of the respective repetition may be enriched with information of the respective further batch. The reduced data of the respective repetition being enriched with information of the respective further batch may form the respective updated version of the reduced data of the respective repetition.

As a consequence, the reduced data may be enriched gradually with information of the data records of the original training data with every repetition of the reading of the respective further batch and of the generating of the updated version of the reduced data. Hence, the proposed method may allow to build the updated reduced data such that the updated reduced data may represent a compressed version of the original training data while it is guaranteed that the size of the updated version of the reduced data is equal or less than the limited storage capacity. Thus, the updated version of the reduced data may comprise a higher information density than the original training data.

The updated version of the reduced data may not only allow a faster training of the ML-model or may not only allow to execute the training of the ML-model on the computing device in the first place. Moreover, the updated version of the reduced data representing the compressed version of the original training data may increase a performance of the training. For example, training the ML-model by means of the compressed version of the original training data may prevent getting trapped in local minima of an error function of the ML-model compared to a training of the ML-model using all data records of the original training data. Thus, the proposed method may enable to reach a higher quality of the ML-model after a training of the ML-model with the provided updated version of the reduced data.

The updated version of the reduced data may be provided by sending the updated version to the computation device or by storing the updated version of the reduced data in the external device. The updated version of the reduced data being stored in the external device may be accessible for the computing device.

The reading of the first and the second batch may be performed in response to receiving the first and the second batch from a source server storing the original training data. Similarly, the reading of the respective further batch of each repetition may be performed in response to receiving the respective further batch from the source server.

The receiving of the first and the second batch may be performed in response to sending the first and the second batch from the source server to the external device or to the computing device, depending on whether the proposed method is performed on the external device or the computing device.

In one example, the updated version of the reduced data of the respective repetition may be generated dependent on the reduced data of the respective repetition and the respective further batch by performing a computation of values of the data records of the updated version of the reduced data of the respective repetition dependent on values of the data records of the reduced data of the respective repetition and values of the data records of the respective further batch. Such a computation may comprise performing interpolations between the values of the data records of the reduced data of the respective repetition and the values of the data records of the respective further batch. However, this may tamper the data records of the original training data.

According to one embodiment, the generating of the updated version of the reduced training data may comprise selecting a subset of the data records of the reduced training data and the further batch. The subset of the data records may form the data records of the updated version of the reduced training data. Considering performing the several repetitions mentioned above, this embodiment may imply that the generating of the updated version of the reduced training data of the respective repetition may comprise selecting a respective subset of the data records of the reduced training data of the respective repetition and the further batch of the respective repetition. The respective subset of the data records may form the data records of the respective updated version of the reduced training data.

According to this embodiment, the data records of the respective further batch of the data records of the original training data or a part of these data records may be included unchanged in the respective updated version of the reduced data. Hence, according to this embodiment, the data records of the original training data may not be tampered. This may be useful if the trained ML-model should represent information given by individual data records of the original training data.

According to one embodiment, the selecting may comprise selecting the data records of the subset randomly from the data records of the reduced training data and the further batch. Considering performing the several repetitions mentioned above, this embodiment may imply that the computing system or the external device may select the data records of the respective subset randomly from the data records of the reduced training data of the respective repetition and the respective further batch of the respective repetition in each repetition. Selecting the data records of the subset randomly may provide a simple version of generating the subset of the data records. Furthermore, this may provoke that the updated version of the reduced data is more suitable for training the ML-model in case the ML-model is designed for solving regression problems.

According to one embodiment, the data records of the reduced training data, also referred to as reduced data in the following, and the further batch may be divided into subgroups. According to this embodiment, the selecting may comprise selecting a respective number of data records from each subgroup. Such a variant of performing the selecting may also be known as "stratified sampling". The selecting of the respective number of data records from each subgroup may be performed randomly.

The updated version of the reduced data may comprise the respective selected data records of each subgroup. A respective ratio of the respective number of the selected data records of the respective subgroup to a respective total number of the data records of the respective subgroup may be referred to as a respective sampling ratio in the following. Thus, to each subgroup the respective sampling ratio may be assigned. This may be done by a user using the computing system or the external device or may be performed automatically.

As described above, the data records may each comprise values of the features. A division of the data records of the reduced training data and the further batch into the subgroups may be performed by selecting one or more features of the features. The selecting of the one or more features may be performed by the user in one example.

In one example, the computing device or the external device may divide the data records of the reduced training data and the further batch into the subgroups dependent on the respective value of a selected feature of the respective data records. Analogously, the computing device or the external device may divide the data records of the reduced training data and the further batch into the subgroups dependent on the respective values of the selected features of the respective data records.

The advantage of performing the stratified sampling may allow that an internal logic of the trained ML-model may represent each behavior of the respective subgroups if the ML-model is trained with the updated version of the reduced data. To realize this, the stratified sampling may be performed such the respective number of the selected data records of each subgroup has the same value. In this case, the data records of the respective subgroups may be equally represented in the updated version of the reduced data.

Generally, the stratified sampling may enable to represent each value or respective intervals of values of one of the target features equally by means of the data records of the updated version of the reduced data. In this case, the selected feature may be one of the target features. The respective number of the selected data records of each subgroup may be the same according to this example.

According to one embodiment, the selecting may further comprise adapting the respective number of the selected data records of each subgroup to a respective size of the respective subgroup. This may imply that the numbers of the selected data records of each subgroup differ from each other. For example, the respective sampling ratios may be the same, and the respective sizes of the respective subgroups may differ. This embodiment may provoke that respective distributions of the values of the respective features of the data records of the reduced data may be similar to respective distributions of the values of the respective features of the data records of the original training data. Thus, a chance that the reduced data may represent an overall behavior of the values of the data records of the original training data to each other may be increased by this embodiment.

According to one embodiment, the subgroups may each comprise a respective relevance. According to this embodiment, the selecting may further comprise adapting the respective number of the selected data records of the respective subgroup to the respective relevance of the respective subgroup. In one example, a higher relevance of the respective subgroup compared to an average relevance of the subgroups may imply a higher respective number of the selected data records of the respective subgroup. The user may determine the respective relevance of each subgroup in one example. In a further example, the computing device or the external device may determine the respective relevance of each subgroup dependent on metadata of the original training data. The metadata of the original training data may comprise information about a respective quality of the data records of the respective subgroup. In this case, the computing device or the external device may determine the respective relevance of each subgroup such that it is proportional to the quality of the data records of the respective subgroup.

According to one embodiment, the data records of the reduced training data and the further batch may each comprise values of several features as described above. One of the features may be a further selected feature. In addition to that, according to this embodiment, the selecting may comprise selecting the data records of the subset such that the values of the further selected feature of the data records of the subset comprise approximately a given distribution. The given distribution may be given by the user or may be computed by means of the computing device or the external device. The given distribution may be a poisson distribution or a gaussian distribution, for example. Alternatively or in addition, the given distribution may be a distribution of the values of the further selected feature of the original training data.

According to one embodiment, the data records of the reduced training data and the further batch each comprise values as described above. In addition to that, according to this embodiment, the selecting may further comprise selecting the data records of the subset such that the data records of the subset together are usable to confirm a hypothesis about a relationship between the values of the data records of the original training data with a given statistical significance.

According to one embodiment, the data records of the reduced training data and the further batch may each comprise values of several features. According to this embodiment, the selecting may comprise defining a quantile for values of a selected feature of the features and selecting the data records of the subset dependent on the quantile. By defining the quantile extreme values of the selected feature may be excluded according to one example. For example, the quantile may comprise the values of the selected feature which are lower than 75 percent of a maximal value of the selected feature. This may be useful for training the ML-model in case the values in the range above the defined quantile are not of interest.

According to one embodiment, the repeating of the generating of the updated version of the reduced training data may comprise computing metadata of the updated version of the reduced training data, in the following also referred to as metadata. According to this embodiment, the providing of the updated version of the reduced training data may comprise providing the metadata of the updated version of the reduced training data. The metadata may be usable for a generating of the ML-model, wherein the generating of the ML-model may comprise a preprocessing of the data records of the updated version of the reduced training data and the training of the ML-model. Thus, the metadata may enable to optimize the preprocessing and/or the training of the ML-model. The preprocessing may be performed before the training and after the generating of the updated version of the reduced training data.

In one example, the metadata may comprise each minimal and maximal value of each feature which is presented by the elements of the data records of the updated version of the reduced data. The maximal and minimal value of each feature which is presented by the elements of the data records of the updated version of the reduced data may be used to perform a normalization of the data records of the updated version of the reduced data described below.

According to one embodiment, the computing of the metadata of the updated version of the reduced training data may comprise computing metadata of the further batch. Furthermore, according to this embodiment, the computing of the metadata may comprise performing a comparison of the metadata of the further batch and the metadata of an updated version of the reduced training data of a preceding repetition of the generating of the updated version of the reduced training data. The computing of the metadata may comprise determining the metadata dependent on the comparison of the metadata of the further batch and the metadata of the updated version of the reduced training data of the preceding repetition of the generating of the updated version of the reduced training data.

The preceding repetition is equal to the last repetition mentioned above. The advantage of comparing the metadata of the updated version of the reduced training data of the preceding repetition with the metadata of the further batch is that computation time may be reduced compared to a variant according to which the metadata may be computed based on all data records of the updated version of the reduced data and the further batch together. For example, minimal and maximal values of each feature which is presented by the elements of the data records of the further batch may be determined and then may be compared to the minimal and maximal values of each feature which is presented by the elements of the data records of the updated version of the reduced data of the preceding repetition. In case, the minimal values of each feature which is presented by the elements of the data records of the further batch may be less than the respective minimal values of each feature which is presented by the elements of the data records of the updated version of the reduced data of the preceding repetition these minimal values may be replaced in the metadata by the minimal values of each feature which is presented by the elements of the data records of the further batch. The same may apply for the respective maximal values of each feature which is presented by the elements of the data records of the updated version of the reduced data of the preceding repetition.

According to one embodiment, the metadata may comprise a total number of data records of the updated version of the reduced training data. The total number of data records may indicate a size of the information given by the reduced data. The higher the total number of data records, the higher a number of parameters of the ML-model may be chosen without producing an overfitting during the training of the ML-model using the reduced data. Generally, the higher the number of parameters of the ML-model, the higher an accuracy of the trained ML-model may be. However, if the number of parameters is chosen too high with respect to the training data used for training the ML-model, here the updated reduced data, overfitting of the ML-model may occur. In this case, the ML-model may perform unsatisfactory with respect to generalization. Hence, choosing the wrong numbers of parameters of the ML-model may be prevented by providing the total number of data records of the reduced data.

According to one embodiment, the data records of the reduced training data and the further batch may each comprise values of several features and the metadata may comprise a total number of the features. The several features may comprise input features and one or more target features as described above. A number of input channels of the ML-model may be chosen such that the number of input channels is equal to a number of the input features. Analogously, a number of output channels of the ML-model may be chosen such that the number of output channels is equal to a number of the target features. Thus, the total number of the features may help to design the ML-model.

According to one embodiment, the data records of the reduced training data and the further batch may each comprise values of several features and the metadata may comprise an information about a type of the respective features. In most cases, the training of the ML-model may be performed such that real values or integer values are send to the input channels of the ML-model. In case, some values of the elements of the data records of the reduced data comprise characters, e.g., the type of the respective feature represented by these elements may be of type "char", the preprocessing of the reduced data may involve converting the characters into real values or integer values. Thus, in one example, the information about a respective type of the respective features may enable to set up the preprocessing such that the ML-model may be trained using strictly real values and/or integer values.

The information about the type of the respective feature may be in the form that the information may indicate whether the respective feature is a categorical or a numerical feature. A categorical feature may comprise characters, for example words, as values, such as "car, fruit or table" for example. A numerical feature may comprise numbers as values, for example integer or real numbers. In case, one of features may be detected as a categorical feature, the values of this feature may be converted into integer values in one example. In one example, the metadata may comprise an information about all the different values of the categorical feature. In one example, the metadata may comprise a counter which may indicate a number of different values of the categorical feature. The counter may be used to divide the data records of the reduced training data and the further batch into the subgroups. For example, a number of subgroups may be equal to a value of the counter. Thus, the metadata may be used to perform the stratified sampling according to this example.

Moreover, a sampling method according to which variant the data records of the reduced training data and the further batch are selected to form the subset may be selected dependent on the information about a type of one of the features. For example, in case one of the features is a numerical feature a random sampling method may be selected. In this case, the ML-model may be trained to solve a regression problem. In case one of the features is a categorical feature a stratified sampling method may be selected. In this case, the ML-model may be trained to solve a classification problem.

In one example, the metadata may comprise an information about a feature of the features comprising only one value. Furthermore, the metadata may comprise an information about a number of the features comprising only one value. In one example, the elements of the data records of the updated version of the reduced data corresponding to the features which comprise only one value may be deleted during the preprocessing of the updated version of the reduced data.

According to one embodiment, the data records of the reduced training data and the further batch may each comprise the elements for storing the values as described above. The method may further comprise detecting empty elements of the data records of the reduced training data and the further batch. The metadata may comprise an information about the empty elements. The information about each empty element may comprise a position of the respective empty element within the respective data record of the updated reduced data comprising the respective empty element, in the following also referred to as respective incomplete data record. The position of the respective empty element within the respective incomplete data record may correspond to one feature of the features, in the following referred to as incomplete feature. The metadata may comprise a respective vector for each incomplete feature, the respective vector indicating which data record of the reduced training data and the further batch may comprise an empty element corresponding to the incomplete feature.

According to one example, the information about the empty elements may be used to either delete one or more of the incomplete data records. In a further example, this information may be used to compute values for the respective empty elements. In one example, a value for the respective empty element may be computed by performing an interpolation of values of elements of a chosen set of data records of the updated reduced data, wherein these values correspond with the incomplete feature. The interpolation may be performed dependent on values of the one or more of the features of the chosen set of data records, wherein these one or more features may not comprise the incomplete feature.

According to one embodiment, the data records of the reduced training data and the further batch may each comprise values of several features as described above. According to this embodiment, the metadata may comprise an information about a value of one of the features being constant in the data records of the reduced training data and the further batch. Generally, if one of the features may comprise constant values, referred to as constant feature in the following, then the constant feature may do not provide information about a relationship between the features. As a consequence, during the preprocessing, the data records of the updated reduced data may be truncated during the preprocessing of the updated reduced data such that these data records do not comprise values of the constant feature.

According to one embodiment, the method may further comprise detecting one of the data records of the reduced training data and the further batch as an outlier. In this case, the metadata may comprise information about the outlier. The information about the outlier may be in form of an index value of the data record being the outlier. In one example, the outlier may comprise a value corresponding to one of the features which is greater than the double of a maximal value of the remaining values this feature. In this case, in the preprocessing, the updated reduced data may be truncated such that the updated reduced data does not comprise the outlier.

According to one embodiment, the data records of the reduced training data and the further batch may each comprise values of several features as described above. According to this embodiment, the method may further comprise detecting a monotonic behavior of the values of one feature of the features, in the following also referred to as monotonic feature. The metadata may comprise information about the monotonic behavior. Generally, monotonic behaviors may be represented by means of linear functions. In one example, the information about the monotonic behavior may be used to create linear activation functions of the ML-model which may comprise the monotonic feature as an input channel.

According to one embodiment, the method may further comprise providing the further batch of the data records in multiple chunks of data records of the original training data. This may have the advantage that a lower band width may be used to transmit the further batch of the data records to the computing device or the external device.

In one example, the metadata may comprise an information about a number of discrete features of the features and an information about a number of continuous features of the features.

In one example, the metadata may comprise an information about elements of different data records of the updated version of the comprising contiguous values. In this case, such an information may be used to group these different data records into the same subgroup when performing the stratified sampling.

Embodiments of the present invention may be implemented using a computing device that may also be referred to as a computer system, a client, or a server. Referring now to FIG. 1, a schematic of an example of a computer system 10 is shown. Computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove.

The computer system 10 may comprise a computer system/server 12.

The computer system/server 12 may be operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, the computer system/server 12 in computer system 10 is shown in the form of a general-purpose computing device. The components of the computer system/server 12 may include, but are not limited to, one or more processors or processing unit 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

The term "program" or "program module" as used herein refers to a set of instructions which contains commands to provoke actions performed by the processor 16 when the processor 16 may read the commands. The set of instructions may be in the form of a computer-readable program, routine, subroutine or part of a library, which may be executed by the processor 16 and/or may be called by a further program being executed by the processor 16. Preferably, the program modules 42 may be executable programs which are compiled according to a type of hardware platform of the computer system/server 12.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
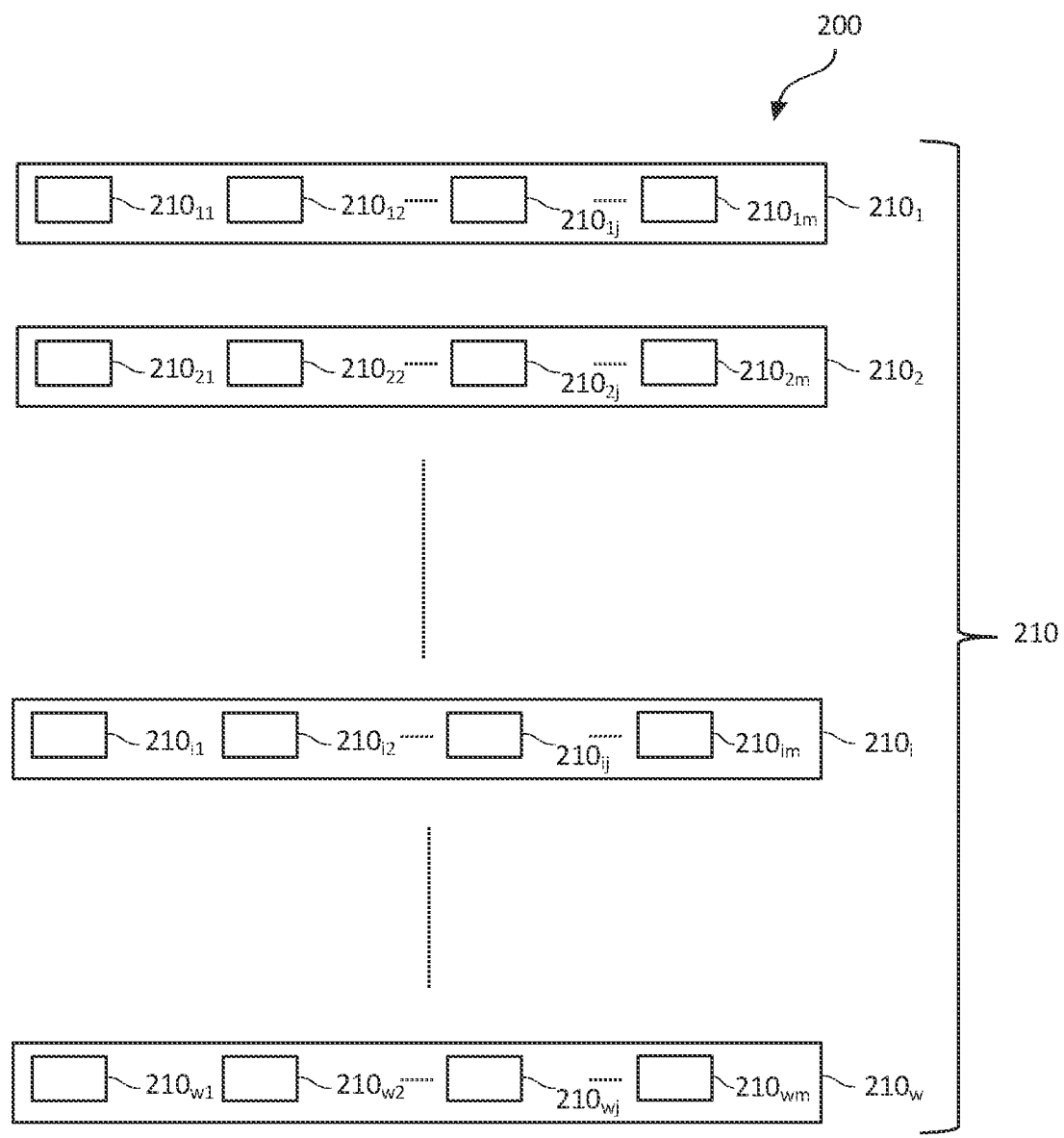
FIG. 6 is a block diagram schematically illustrating an updated reduced training data for training an ML-model according to at least one embodiment.

A computer system such as the computer system 10 shown in FIG. 1 may be configured, and may be used, for performing operations and functions disclosed herein. For example, the computer system 10 may be configured for providing updated reduced training data 200 comprising data records 210 (FIG. 6). The updated reduced training data 200 may be designed for training an ML-model 70, depicted in FIG. 7. The training of the ML-model 70 may be performed by means of the computer system 10, in one example, or a further computing device, not shown in the Figures, in another example. In the latter example, the further computing device may comprise a limited storage capacity. The further computing device, given the limited storage capacity, may be designed for storing all data records 210 of the updated reduced training data 200. In the former example, the computer system 10 may comprise the limited storage capacity. For example, the RAM 30 may comprise the limited storage capacity.

The computer system 10 may be connected with a source device 35 via the network adapter 20. In one example, a connection between the network adapter 20 and the source device 35 may be provided by means of the internet. The source device 35 may store original training data 1100 (FIG. 3).

Figure 3:
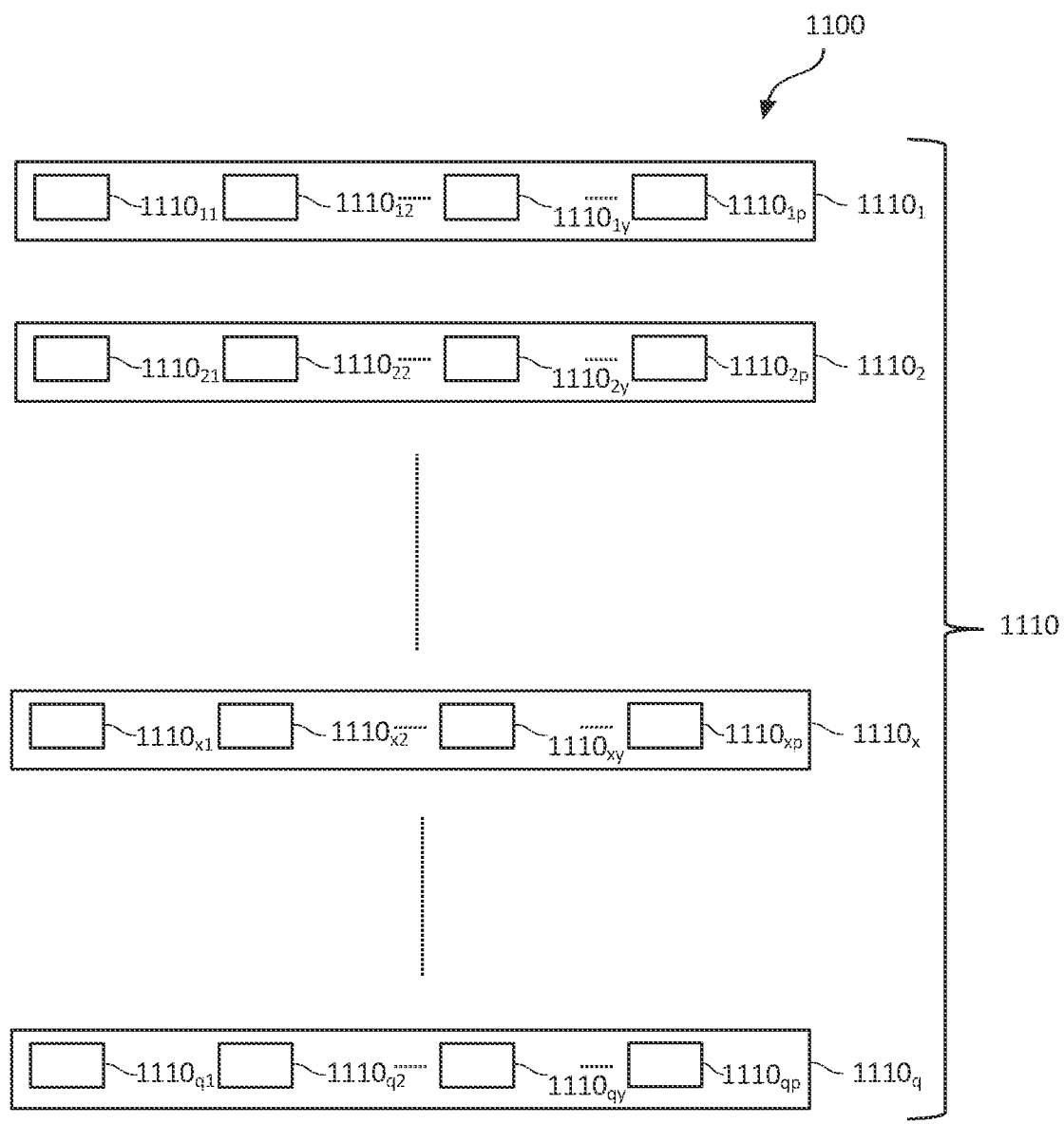
FIG. 3 is a block diagram schematically illustrating an original training data for training an ML-model according to at least one embodiment.

Referring briefly to FIG. 3, the original training data 1100 may comprise a number of "q" data records 1110 ($1110_1 \ldots 1110_x \ldots 1110_q$). In the following, the index "x" may be used to describe a respective data record of the data records 1110 of the original training data 1100. The respective data records $1110_x$ may each comprise elements, such as a respective first element $1110_{x1}$, a respective second element $1110_{x2}$, a respective y-th element $1110_{xy}$ and a respective p-th element $1110_{xp}$. In the following, the index "y" may be used to describe a respective element of the respective data records $1110_x$. The respective elements $1110_{xy}$ of the data records $1110_x$ of the original training data 1100 may comprise a respective value, such as an integer value, a real value, a Boolean value or a string comprising characters. In some cases, one or more of the respective elements $1110_{xy}$ may be void.

Figure 2:
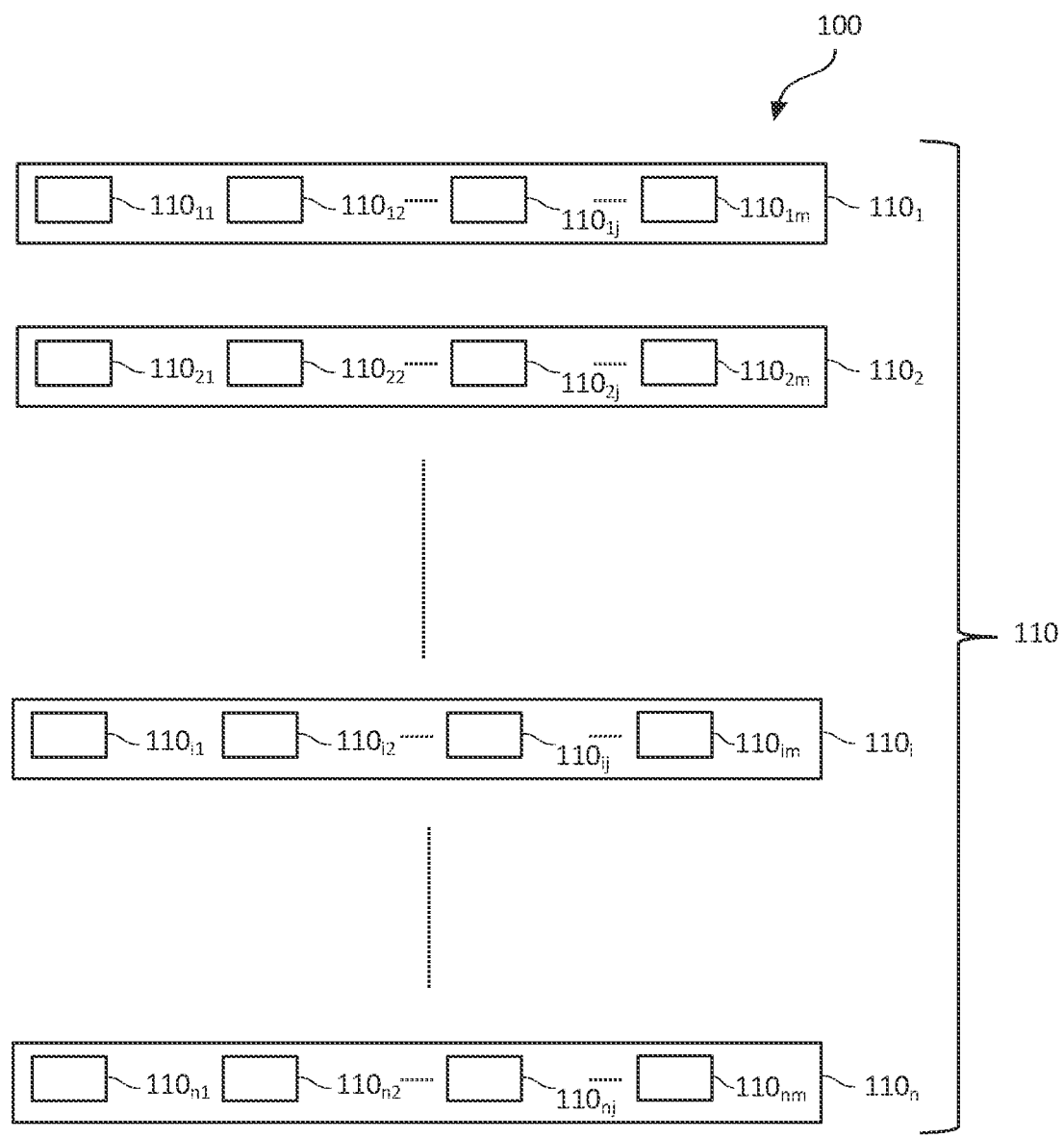
FIG. 2 is a block diagram schematically illustrating a reduced training data for training an ML-model according to at least one embodiment.

Referring now to FIG. 2, the updated reduced training data 200 illustrated in FIG. 6 may be generated dependent on reduced training data 100.

The reduced training data 100 may comprise a number of "n" data records 110 ($110_1 \ldots 110_i \ldots 110_n$). In the following, the index "i" may be used to describe a respective data record of the data records 110 of the reduced training data 100. The respective data records $110_i$ may each comprise elements, such as a respective first element $110_{i1}$, a respective second element $110_{i2}$, a respective j-th element $110_{ij}$ and a respective m-th element $110_{im}$. In the following, the index "j" may be used to describe a respective element of the respective data records $110_i$. The respective elements $110_{ij}$ of the data records $110_i$ of the reduced training data 100 may comprise a respective value, such as an integer value, a real value, a Boolean value or a string comprising characters. In some cases, one or more of the respective elements $110_{ij}$ may be void. The number "q" data records 1110 of the original training data 1100 may be higher, for example, more than ten, one hundred, or one thousand times higher, than the number "n" data records 110 of the reduced training data 100. In one example, a size of the original training data 1100 may be 100 Gigabyte. The limited storage capacity of the RAM 30 may be three Gigabyte according to this example.

The computer system 10 may be configured for performing a first, second, third, fourth, fifth, and sixth operation. For example, the processor 16 may perform the first, second, third, fourth, fifth, and sixth operation.

Figure 4:
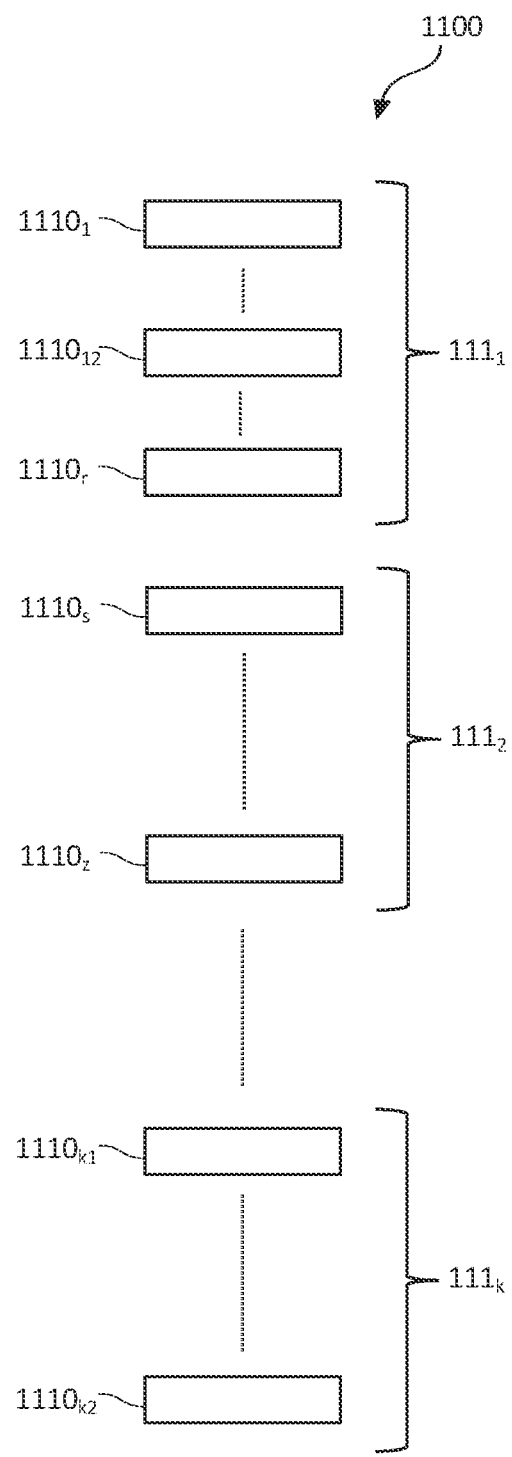
FIG. 4 is a block diagram schematically illustrating batches of the original training data shown in FIG. 3 according to at least one embodiment.

Referring now to FIG. 4, the first operation of computer system 10 may comprise reading a first batch $111_1$ of the data records and a second batch $111_2$ of the data records of the original training data 1100.

The second operation may comprise generating the reduced training data 100 of FIG. 2 (also referred to as reduced data 100), dependent on the first batch $111_1$ and the second batch $111_2$ of the original training data 1100.

The third operation may comprise reading a further batch $111_k$ of the data records of the original training data 1100. According to the example given above, a size of the further batch $111_k$ may be one Gigabyte.

The fourth operation may comprise generating the updated version of the reduced data 200 of FIG. 6 (also referred to as updated reduced data 200), dependent on the reduced data 100 and the further batch $111_k$. The processor 16 may perform the fourth operation such that a size of the updated reduced data 200 is less than a size of the limited storage capacity and less than a combined size of the reduced data 100 and the further batch $111_k$ together. In one embodiment, the updated reduced data 200 being less than the size of the limited storage capacity also includes the updated reduced data 200 being equal to or less than the size of the limited storage capacity.

The fifth operation may comprise repeating the reading of a further batch $111_k$ of the data records of the original training data 1100 and generating the updated reduced data 200 dependent on the reduced data 100 and the further batch $111_k$. The index "k" may vary with each repetition of the third and fourth operation (also referred to as respective repetition or repetition). Consequently, the computer system 10 may read a respective different further batch $111_k$ of the data records of the original training data 1100 when executing the respective repetition. A first data record of the respective further batch $111_k$ may be specified by an index "k1" and a last data record of the respective further batch $111_k$ may be specified by an index "k2". A value of the index "k1" and a value of the index "k2" may vary in each repetition. Hence, the respective further batch $111_k$ may comprise different data records of the original training data 1100 in each repetition. The processor 16 may repeat the third and fourth operation until a stop criterion is met. In a simple example, the stop criterion may be a time limit. In a further example, the stop criterion may be met if each data record of all the data records of the original training data 1100 has been read in the form of the further batch $111_k$ in one of the respective repetitions. In another example, the stop criterion is met if the data records of the updated reduced data 200 fulfill a data metric measure. In one example, the data metric measure may be in the form that the values of elements of the data records of the updated reduced data 200 corresponding to the further selected feature described above are distributed approximately according to the given distribution.

The sixth operation may comprise providing the updated reduced data 200 for the training of the ML-model 70. A size of the updated reduced data 200 may be smaller than a size of the original training data 1100.

Figure 5:
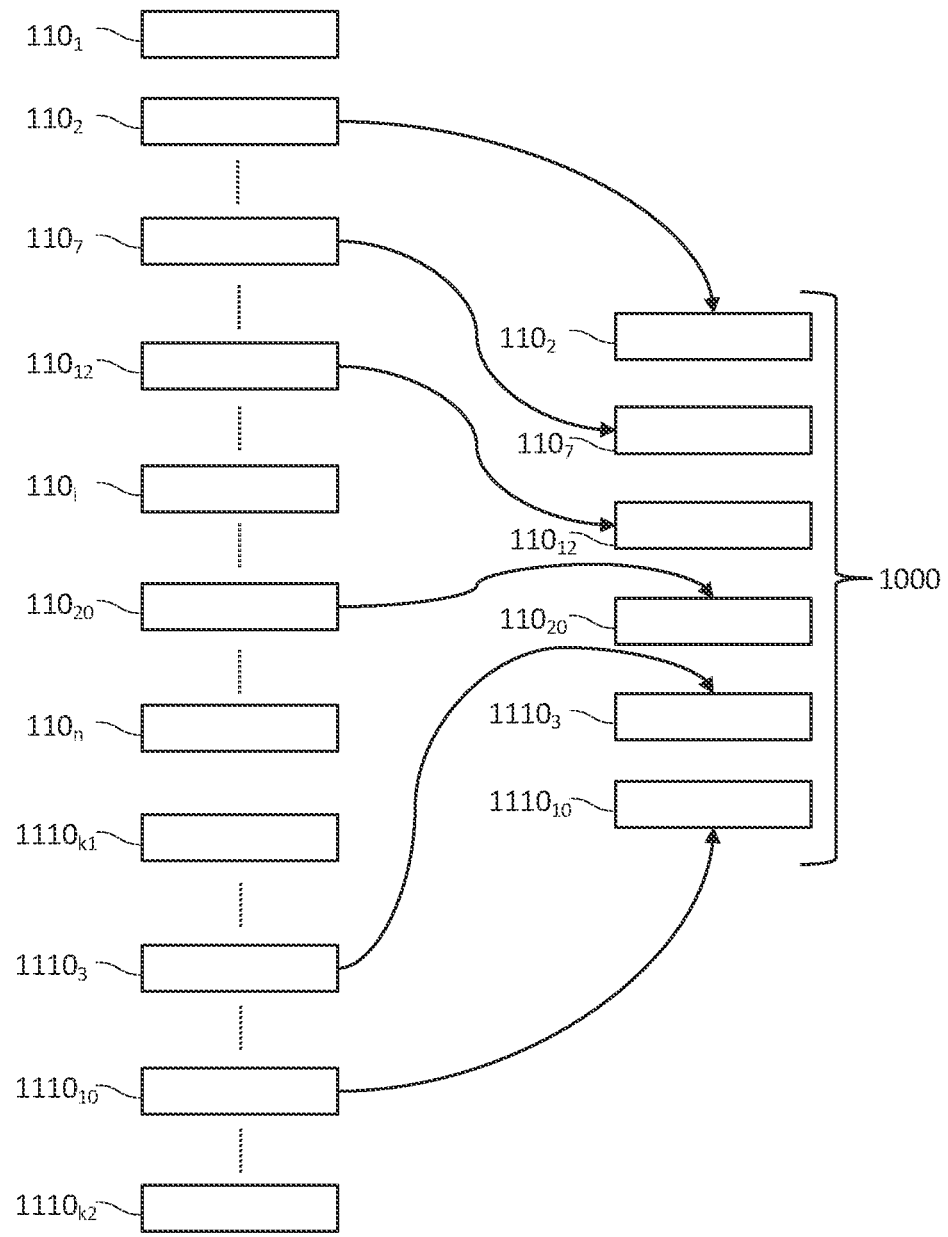
FIG. 5 is a block diagram schematically illustrating a subset of data records of the reduced training data shown in FIG. 2 and a further batch of the data records of the original training data shown in FIG. 3 according to at least one embodiment.

Referring also to FIG. 5, in order to produce the updated reduced data 200 in each repetition, the processor 16 may select a subset 1000 of the data records of the reduced data 100 (FIG. 2) and the further batch $111_k$ (FIG. 4). The data records of the subset 1000 may form the data records of the updated reduced data 200. In the example shown in FIG. 5, the data records $110_2$, $110_7$, $110_{12}$ and $110_{20}$ may be the selected data records of the reduced data 100 to build the subset 1000 and the data records $1110_3$ and $1110_{10}$ may be selected data records of the further batch $111_k$ to build the subset 1000. Of course, the indices of the data records of the reduced data 100, in this case 2, 7, 12 and 20, and the indices of the data records of the further batch $111_k$, in this case 3 and 10, only describe an example for determining the data records of the subset 1000 in a respective repetition of the repetitions of the third and fourth operation. The indices of the data records of the reduced data 100 and the indices of the data records of the further batch $111_k$ may vary with each repetition. As well, a value of the index "k" may vary with each repetition as mentioned above. The computer system 10 may start a new repetition in response to receiving the respective further batch $111_k$ of each repetition.

Referring now to FIG. 6, the updated reduced data 200 may be described analogously to the reduced data 100. In one embodiment, the updated reduced data 200 may comprise a number of "w" data records 210 ($210_1 \ldots 210_i \ldots 210_w$). In one embodiment, the index "i" may be used to describe a respective data record of the data records 210 of the updated reduced data 200. The respective data records $210_i$ may each comprise elements, such as a respective first element $210_{i1}$, a respective second element $210_{i2}$, a respective j-th element $210_{ij}$ and a respective m-th element $210_{im}$. In one embodiment, the index "j" may be used to describe a respective element of the respective data records $210_i$. The respective elements $210_{ij}$ of the data records $210_i$ of the updated reduced data 200 may comprise a respective value, such as an integer value, a real value, a Boolean value or a string comprising characters. In some cases, one or more of the respective elements $210_{ij}$ may be void.

As the data records of the subset 1000 (FIG. 5) may form the data records of the updated reduced data 200, the updated reduced data 200 may comprise different data records compared to the reduced data 100 (FIG. 2). Given the example described above, the first data record $210_1$ of the updated reduced data 200 may be the data record $110_2$ and the last data record $210_w$ of the updated reduced data 200 may be the data record $1110_{10}$. Hence, in one example, the updated reduced data 200 may not comprise the first data record $110_1$ of the reduced data 100. The updated reduced data 200 may further comprise the data records $110_7$, $110_{12}$, $110_{20}$ and $1110_3$. One of the data records $110_7$, $110_{12}$, $110_{20}$ and $1110_3$ may be specified with the data record $210_i$ in FIG. 6.

A generation of the subset 1000 as shown in FIG. 5 may be performed in an actual repetition of the third and fourth operation in order to generate the updated reduced data 200. The updated reduced data 200 of the actual repetition may be the reduced data 100 of a subsequent repetition of the third and fourth operation, which may be executed by the processor 16 after the actual repetition. To realize this, the processor 16 may store the updated reduced data 200 in the cache memory 32 and relabel the updated reduced data 200 as reduced data 100 when starting an execution of the subsequent repetition. This may be realized by executing a main program module 44 by means of the processor 16.

In one example, the number "w" of data records 210 (FIG. 6) may be equal to the number "n" of data records 110 (FIG. 2). In this case, a size of the updated reduced data 200 may be equal to the size of the reduced data 100. This may prevent a successive augmentation of the size of the updated reduced data 200 with each repetition. However, according to further example, the number "w" may vary in the course of performing the repetitions. For example, number "w" may increase gradually, for example until the size of the updated reduced data 200 may be equal to 1.5 Gigabyte. This may allow reading the respective further batch $111_k$ with a size of at least one Gigabyte into the RAM 30.

With reference to FIGS. 2 and 4, in one example, the processor 16 may generate the reduced data 100 by concatenating the data records $1110_1 \ldots 1110_r$ of the first batch $111_1$ and the data records $1110_s \ldots 1110_z$ of the second batch $111_2$ when executing the second operation. Thus, the data records of the reduced data 100 may be the data records of the first batch $111_1$ and the second batch $111_2$. According to this example, a size of the reduced data 100 may be two Gigabyte. In one example, the first data record $110_1$ of the reduced data 100 may be the data record $1110_1$ and the last data record $110_n$ of the reduced data 100 may be the data record $1110_z$. The indices "r", "s" and "z" may take on any integer value. For example, the first batch $111_1$ does not necessarily have to comprise the first data record $1110_1$ of the original training data 1100. A first data record of the first batch $111_1$ may be data record $1110_{12}$ of the original training data 1100, for example.

According to a further example, the processor 16 may generate the reduced data 100 by selecting data records of the data records $1110_1 \ldots 1110_r$ of the first batch $111_1$ and data records of the data records $1110_s \ldots 1110_z$ of the second batch $111_2$ when executing the second operation. Such a selection may be performed similarly to a generation of the subset 1000 described above. According to this example, the size of the reduced data 100 may be less than two Gigabyte (e.g., one Gigabyte).

According to one example, the processor 16 may select the data records of the subset 1000 (FIG. 5) randomly from the data records of the reduced data 100 and the further batch $111_k$ to build the subset 1000. With respect to example described above, the processor 16 may determine the indices of the data records of the reduced data 100, in this case 2, 7, 12 and 20, and the indices of the data records of the further batch $111_k$, in this case 3 and 10, randomly.

Each data record of the original training data 1100 may describe a respective state of a system or an entity. The respective state may be specified by values of several features. The features may describe physical quantities of the system or the entity, for example, a temperature, a movement, a response time and/or an intensity of communication. In FIG. 3, each data record of the original training data 1100 is shown in the form of a respective row. The values of one of each feature are shown in the form columns in FIG. 3. For example, the first element $1110_{x1}$ of the respective data record $1110_x$ may store a respective value of a first feature, the second element $1110_{x2}$ of the respective data record $1110_x$ may store a respective value of a second feature, the y-th element $1110_{xy}$ of the respective data record $1110_x$ may store a respective value of an y-th feature, and the p-th element $1110_{xp}$ of the respective data record $1110_x$ may store a respective value of a p-th feature. The same may apply to the FIG. 2 and FIG. 6 with respect to the data records of the reduced data 100 and the updated reduced data 200 respectively. However, instead of the indices "x" and "y", the indices "i" and "j" are used. In one example, the number "p" may be equal to the number "m". This may imply that the number features represented by the original training data 1100 is equal to the number of features represented by the reduced data 100 and the updated reduced data 200. Though, this may not necessarily be the case in general.

Figure 7:
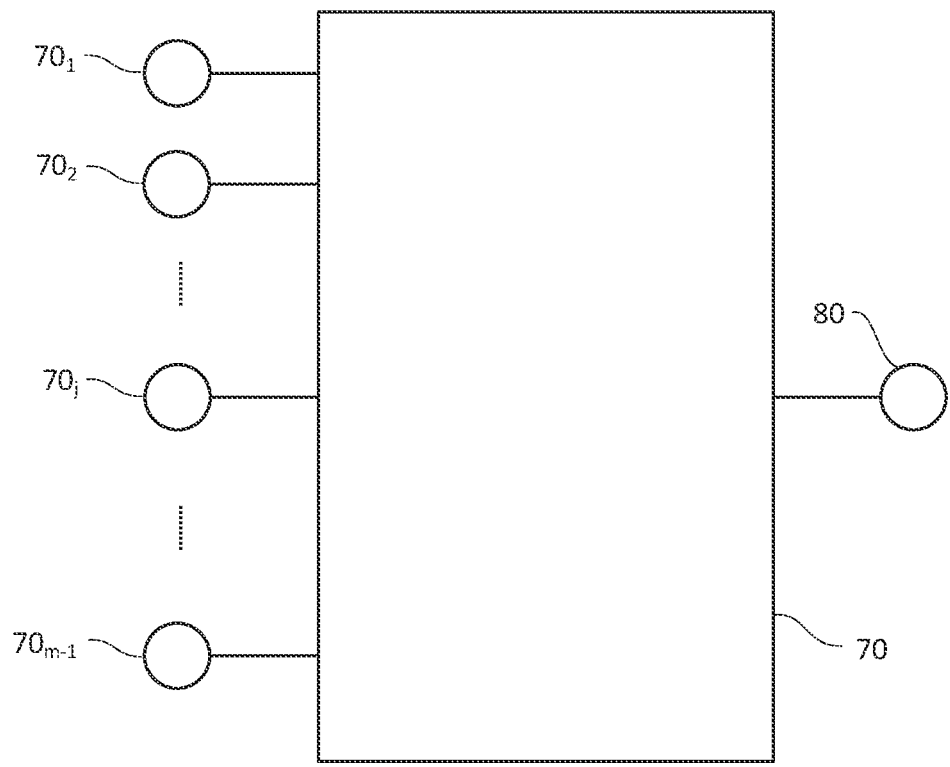
FIG. 7 is a block diagram schematically illustrating an ML-model according to at least one embodiment.

Referring now to FIG. 7, generally, the training of the ML-model 70 may provoke that the trained ML-model 70 may be used to perform a prediction of the system or the entity. In the following, one example for performing the training of the ML-model 70 may be described.

For the training, the updated reduced data 200 may be preprocessed, for example by means of the processor 16 in case the processor 16 may perform the training. For example, the processor 16 may divide the several features into input features and at least one output feature. Such a division of the updated reduced data 200 may be performed dependent on user input data which may be entered via the external devices 14.

For sake of simplicity, it is assumed that the m-th feature is selected as the output feature and the remaining features are selected as the input features. Input channels and output channels of the ML-model 70 may be adapted to the input features and the output feature.

Given the example of the m-th feature being the only output feature, the processor 16 may perform several training iterations when performing the training of the ML-model 70. During a respective training iteration, the processor 16 may load successively the respective data records $210_i$ of the updated reduced data 200 and may send the value of the respective first element $210_{i1}$ of the respective data record $210_i$ to a first input channel $70_1$, the value of the respective second element $210_{i2}$ of the respective data record $210_i$ to a second input channel $70_2$, the value of the respective j-th element $210_{ij}$ of the respective data record $210_i$ to an j-th input channel $70_j$ and the value of the respective (m−1)-th element $210_{i, m-1}$ of the respective data record $210_i$ to an (m−1)-th input channel $70_{m-1}$.

Furthermore, during the respective training iteration, the processor 16 may compute a respective predicted target value of the target feature for each data record $210_i$ dependent on the values of the elements of the respective data record $210_i$, which are sent to the input channels $70_1$, $70_2$, ... $70_j$, ... $70_{m-1}$, as described above, and dependent on values of parameters of the ML-model 70. The respective predicted target value may be provided via an output channel 80 of the ML-model 70. Furthermore, the processor 16 may compute a respective error value dependent on the respective predicted target value of each data record $210_i$ and the value of the m-th element $210_{i, m}$ of the respective data record $210_i$. In one example, the respective error value may be a square root of a respective difference between the respective predicted target value of each data record $210_i$ and the value of the m-th element of the respective data record $210_i$.

Furthermore, during the respective training iteration, the processor 16 may compute a training error value dependent on the respective error values. In one example, the training error value may be the sum of all respective error values. The processor 16 may compute a value of a respective derivative of the training error with respect to the respective parameter. Furthermore, the processor 16 may change the value of the respective parameter dependent on the value of the respective derivative of the training error with respect to the respective parameter at the end of the respective training iteration.

Adapting the values of the respective parameters of the ML-model 70 on the basis of the respective derivatives may reduce the training error. If the training error reaches a given threshold, then the ML-model 70 may be regarded as being trained and may be in a trained state. Adapting the values of the parameters of the ML-model 70 may be performed using one or more learning algorithms such as, for example, linear regression, backpropagation, or K-means, often referred to as "machine learning". The ML-model 70 is either trained by machine learning and by that in the trained state; or machine learning may be applied to the ML-model 70 in order to change the state of the ML-model 70 from an untrained state of the ML-model 70 to an intermediate trained state or to the trained state or from the intermediate trained state to the trained state. The ML-model 70 may have different training states, for example the intermediate trained state, between the untrained and the trained state. In each different training state the ML-model 70 may comprise a different combination of values of the parameters of the ML-model 70.

According to one example, the processor 16 may select the data records of the subset 1000 by performing a stratified sampling. In a first step of the stratified sampling, the processor 16 may divide the data records 110 of the reduced training data 100 and the further batch $111_k$ into subgroups. In the following, one example for performing such a division into subgroups is given. Firstly, the processor 16 may perform a sorting of the data records 110 of the reduced training data 100 and the further batch $111_k$ according to their respective values of one selected sorting feature. The sorting feature may be one of the features and may be defined by the user input data. For example, the sorting feature may be the target feature or one of the input features. In response to the sorting, the processor 16 may determine an interval ranging from the minimum value of the sorting feature of the data records 110 of the reduced training data 100 and the further batch $111_k$ to the maximum value of the sorting feature of the data records 110 of the reduced training data 100 and the further batch $111_k$. Furthermore, the processor 16 may define subintervals of the interval. In one example, the subintervals may be of equal size. The processor 16 may assign each data record of the data records 110 of the reduced training data 100 and the further batch $111_k$ to the respective subinterval if the value of the element of the sorting feature of this respective data record falls within the respective subinterval. The data records which are assigned to the respective subinterval may form one respective subgroup of the subgroups.

In one example, the selecting of the data records of the subset 1000 may be performed such that the subset 1000 comprises an equal number of data records of each subgroup. In case, the sorting feature is the target feature, this may support the training such that the trained ML-model 70 may be able to predict values of the target feature well in the whole range from the minimum to the maximum value of the target feature. The selecting of the data records of the subset 1000 from each subgroup may be performed randomly.

According to a further example, the selecting of the data records of the subset 1000 may be performed such that the subset 1000 comprises a given respective number of data records of each subgroup. The respective number of data records of each subgroup may be specified by the user input data. In one example, the respective number of data records of each subgroup may be determined according to a respective relevance of the respective subgroup.

Figure 8:
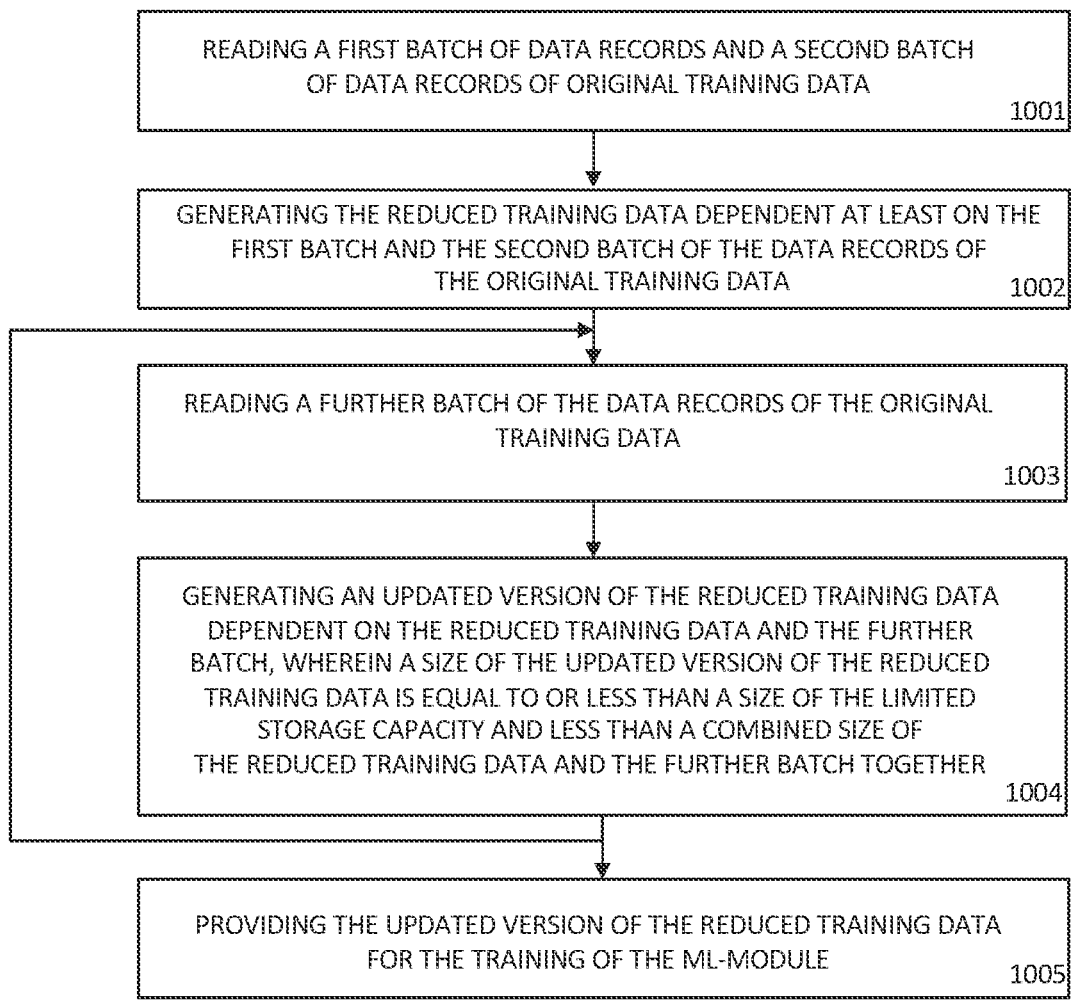
FIG. 8 is an operational flowchart illustrating a process for providing reduced training data for training an ML-model according to at least one embodiment.

Referring now to FIG. 8, an operational flowchart for generating the updated reduced data 200 according to at least one embodiment is depicted.

At 1001, the first batch $111_1$ (FIG. 4) of the data records 1110 and the second batch $111_2$ (FIG. 4) of the data records 1110 of the original training data 1100 may be read.

Then at 1002, the reduced training data 100 may be generated dependent on the first batch $111_1$ and the second batch $111_2$ of the original training data 1100.

Then at 1003, the further batch $111_k$ (FIG. 4) of the data records of the original training data 1100 may be read.

Then at 1004, the updated reduced data 200 is generated dependent on the reduced data 100 and the further batch $111_k$ such that the size of the updated reduced data 200 is equal to or less than the size of the limited storage capacity and less than the combined size of the reduced data 100 and the further batch $111_k$ together.

Next, 1003 and 1004 may be repeated. In one example, 1003 and 1004 may be repeated until the stop criterion is met. In another example, 1003 and 1004 may be repeated infinitely. In this case, the computer system 10 may periodically receive further data records of constantly modifying original training data 1100 in the form of the further batch $111_k$ in each repetition, wherein the index "k" varies with each repetition as described above.

Then at 1005, the updated reduced data 200 may be provided for the training of the ML-model 70, wherein the size of the updated reduced data 200 may be smaller than the size of the original training data 1100. The updated reduced data 200 may be provided by storing the updated reduced data 200 in the RAM 30 or in the storage system 34.

Figure 9:
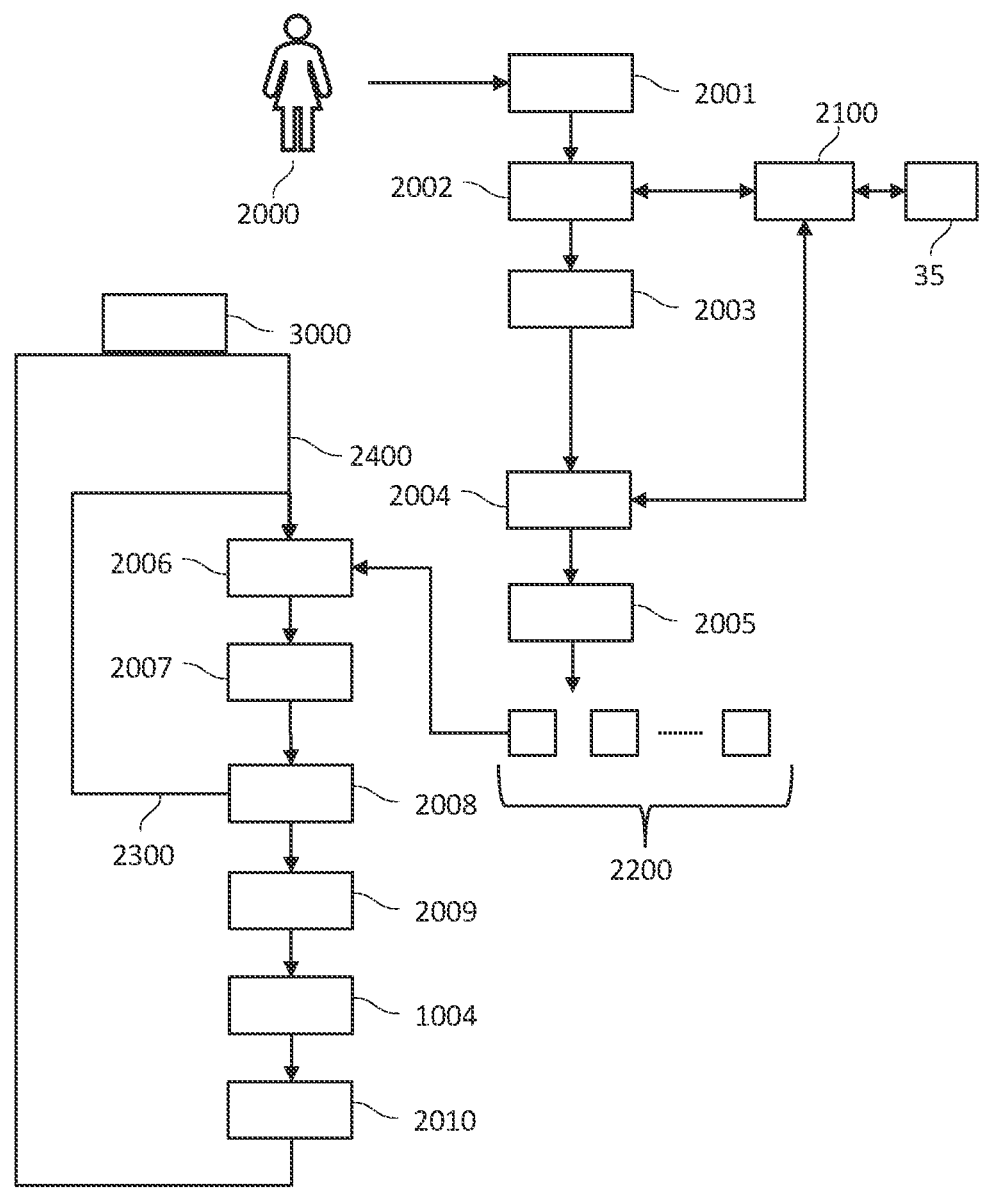
FIG. 9 is an operational flowchart illustrating another process for providing reduced training data for training an ML-model shown in FIG. 8.

Referring now to FIG. 9, an operational flowchart of a further example of generating the updated reduced data 200 according to at least one embodiment is depicted.

At 2001, a user 2000 may specify a request for generating the updated reduced data 200. For example, the user 2000 may input the user input data described above via the external device 14. In one example, the user input data may specify the limited storage capacity. Alternatively or in addition, the user input data may specify the sorting feature.

Then at 2002, the request may be processed such that a data transfer from the source device 35 to the computer system 10 may be prepared. For example, a number of channels for transferring data from the source device 35 to the computer system 10 may be specified. This may be done by performing a communication with the source device 35. The number of channels may define a number of parallel threads which may be executed to generate the updated reduced data 200. Furthermore, at 2002, a transfer protocol 2100 may be determined. The transfer protocol 2100 may specify the number of channels and the number of the features of each data record of the original training data 1100.

Then at 2003, the number of parallel threads may be started. In one example, the processor 16 may be a multi-core processor comprising a respective core for executing one respective parallel thread of the parallel threads.

Then at 2004, the respective core may execute the respective parallel thread such that a respective minibatch of the data records of the original training data 1100 may be read by means of the respective core via the network adapter 20. The transfer protocol 2100 may specify a size of the respective minibatch, in one example. The respective core may perform a reading of the respective minibatch in response to receiving the respective minibatch using the transfer protocol 2100.

Then at 2005, the respective core may store the respective minibatch in a queue 2200, for example in the RAM 30. Thus, according to this example, the queue 2200 may comprise the minibatches read by means of the cores of the processor 16.

Then at 2006, the respective core may read randomly one minibatch from the queue 2200. Then at 2007, the respective core may append the respective one minibatch read in 2006 to a chunk container. The chunk container may be provided in form of a first storage region of the RAM 30.

Then at 2008, the respective core may check whether a size of the minibatches stored in the chunk container has reached a given batch size. The batch size may be equal to one Gigabyte according to the example described above. If the size of the minibatches stored in the chunk container is below the given batch size, then 2006 and 2007 may be repeated. If the size of the minibatches stored in the chunk container is equal or greater than the given batch size, then the further batch $111_k$ of the data records of the original training data 1100 is generated. The further batch $111_k$ of the data records of the original training data 1100 may be the totality of all minibatches stored in the chunk container, in one example.

Then at 2009, the further batch $111_k$ of the data records of the original training data 1100 may be joined with the reduced data 100, for example by writing the further batch $111_k$ of the data records into a sample data container. The sample data container may be provided in the form of a second storage region of the RAM 30. The second storage region may store the reduced data 100. The sample container may not store the reduced data 100 during an initial execution of 2009. If the sample container stores the reduced data 100, then the updated reduced data 200 may be generated by performing 1004 as described above. For example, the subset 1000 of the data records of the reduced data 100 and the further batch $111_k$ may be selected according to one of the variants described above. In 2010, the reduced data 100 may be replaced by the updated reduced data 200. In one example, the processor 16 may realize this by deleting the data records of the further batch $111_k$ and the reduced data 100 which are not part of the subset 1000. By that, a further space in the second storage region may be provided to load the further batch $111_{k+1}$ of the subsequent repetition of 1004. In response to 2010, 2006 may be restarted. In the variant described in FIG. 9 the executing of the third operation, e.g., 1003, is described in the form of further "inner" repetitions of 2006 and 2007 building an inner loop 2300 of the variant of the proposed method. The repetitions described above may build an outer loop 2400.

A variant of performing the selection of the data records of the data records of the reduced data 100 and the further batch $111_k$ in order to build the subset 1000 may depend on the type of problem which the ML-model 70 is supposed to model. The type of problem may depend on knowledge about the system or the entity described above. If the problem is a classification problem, then the stratified sampling may be executed by the computer system 10 in order to build the subset 1000. If the problem is a regression problem, then a random selection of the data records of the reduced data 100 and the further batch $111_k$ may be executed as described above by the computer system 10 in order to build the subset 1000.

The processor 16 may generate metadata 3000 of the updated reduced data 200 in each repetition of the outer loop

2400 or in each repetition of the steps 1003 and 1004 according to the variant of the method as depicted in FIG. 6. The metadata 3000 may comprise the total number data records of the updated reduced data 200, a total number of features which are represented by the elements of the data records of the updated reduced data 200, an information about empty elements of the data records of the updated reduced data 200 and/or an information of a respective type of the features, e.g., an information of a respective type of value of the elements of the data records of the updated reduced data 200. Furthermore, the metadata 3000 may comprise an information about one or more of the features being constant in the data records of the updated reduced data 200, an information about a monotonic behavior of one or more of the features represented by the data records of the updated reduced data 200 and/or an information about one or more outliers in the data records of the updated reduced data 200. Furthermore, the metadata 3000 may comprise an information about respective maximal and minimal values of the respective elements of the data records of the updated reduced data 200. In one example, the metadata 3000 may be provided by storing the metadata 3000 in the RAM 30.

In one example, the processor 16 may set up the ML-model 70 dependent on the metadata 3000. For example, the processor 16 may build a number of input channels according to a number of features of the data records of the updated reduced data 200 representing input features. Alternatively, or in addition, the processor 16 may perform a normalization of the data records of the updated reduced data 200 dependent on the respective maximal and minimal values of the respective elements of the data records of the updated reduced data 200. In one example, the normalization may be performed such that respective maximal and minimal values of the respective elements of the data records of the updated reduced data 200 are "1" and "−1" after the normalization. The normalization may speed up the training of the ML-model 70. Setting up the ML-model 70 may be considered as a part of the preprocessing of a generating of the ML-model 70.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
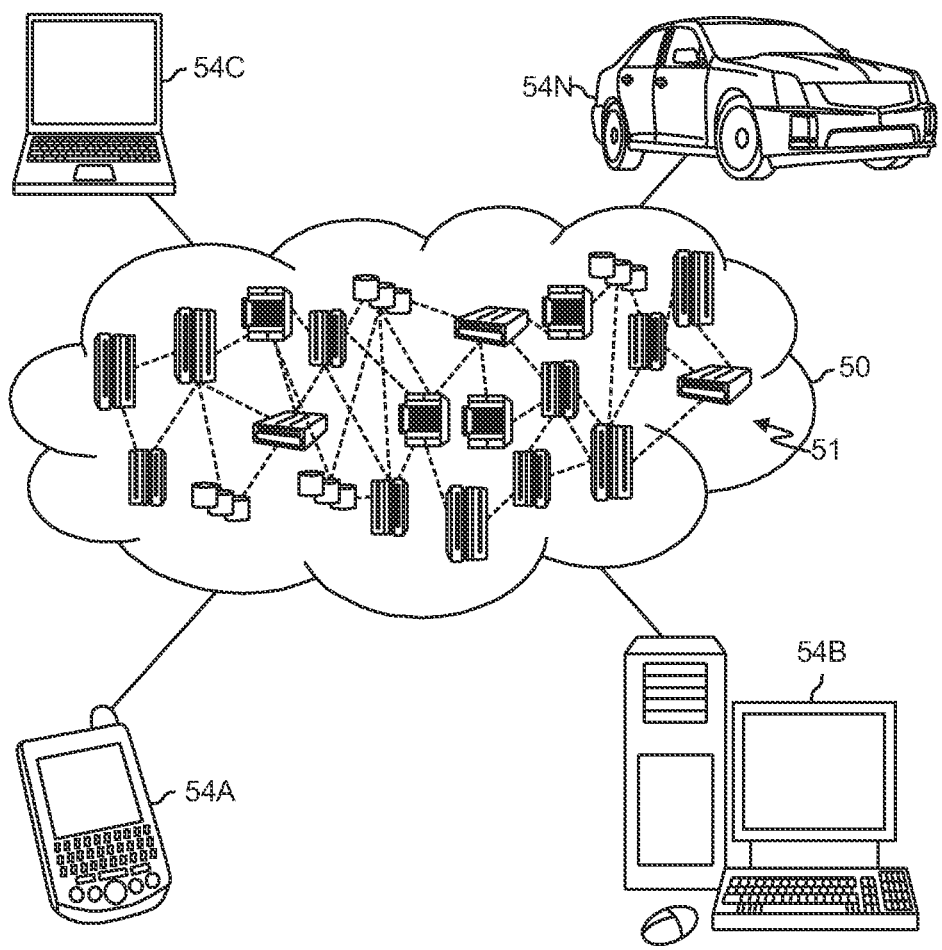
FIG. 10 is a block diagram of an illustrative cloud computing environment including the computer system depicted in FIG. 1, in accordance with an embodiment of the present disclosure.

Referring now to FIG. 10, illustrative cloud computing environment 50 is depicted. As shown, cloud computing environment 50 includes one or more cloud computing nodes 51 with which local computing devices used by cloud consumers, such as, for example, personal digital assistant (PDA) or cellular telephone 54A, desktop computer 54B, laptop computer 54C, and/or automobile computer system 54N may communicate. Nodes 51 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 51 and cloud computing environment 50 can communicate with any type of computerized device over any type of network and/or network addressable connection (e.g., using a web browser).

Figure 11:
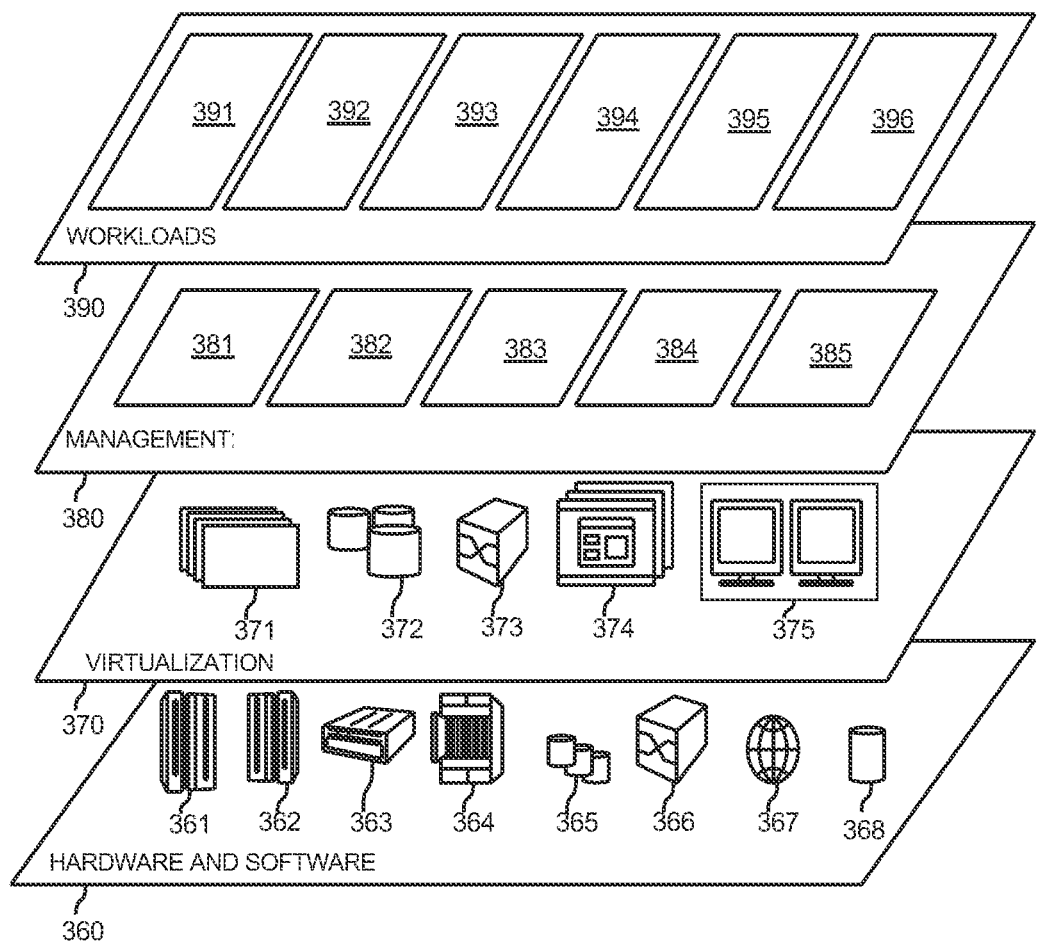
FIG. 11 is a block diagram of functional layers of the illustrative cloud computing environment of FIG. 10, in accordance with an embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and ML-model processing 396.

A computer program product of the present invention comprises one or more computer readable hardware storage devices having computer readable program code collectively stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In the following, the embodiments of the present disclosure will be described again by a list of clauses highlighting several possible, non-exclusive combinations of features disclosed herein:

1. A computer-implemented method, comprising:
   reading a first batch of data records and a second batch of data records of an original training data;
   generating a reduced training data for training a machine learning model (ML-model) using a computing device, wherein the computing device comprises a limited storage capacity for storing the reduced training data, and wherein the reduced training data is dependent at least on the first batch and the second batch of the data records of the original training data;
   reading a further batch of the data records of the original training data;
   generating an updated version of the reduced training data dependent on the reduced training data and the further batch, wherein a size of the updated version of the reduced training data is less than a size of the limited storage capacity of the computing device and less than a combined size of the reduced training data and the further batch;
   repeating the reading on another further batch of the data records of the original training data;
   repeating the generating of the updated version of the reduced training data based on the another further batch of the data records of the original training data; and
   providing the updated version of the reduced training data for the training of the ML-model, wherein the size of the updated version of the reduced training data is smaller than a size of the original training data.

2. The method of clause 1, wherein the generating of the updated version of the reduced training data further comprises: selecting a subset of the data records of the reduced training data and the further batch, wherein the subset of the data records form the data records of the updated version of the reduced training data.

3. The method of clause 2, further comprising:
   randomly selecting the subset from the data records of the reduced training data and the further batch.

4. The method of clause 2, further comprising:
   dividing the data records of the reduced training data and the further batch into a plurality of subgroups; and
   selecting a respective number of data records from each subgroup of the plurality of subgroups.

5. The method of clause 4, wherein the selecting further comprises:
    adapting the respective number of the selected data records of a respective subgroup to a respective size of the respective subgroup.
6. The method of clause 4, wherein the plurality of subgroups each comprise a respective relevance and the selecting further comprises: adapting the respective number of the selected data records of the respective subgroup to the respective relevance of the respective subgroup.
7. The method of clause 2, wherein the data records of the reduced training data and the further batch each comprise values of several features, wherein one of the several features is a selected feature, wherein the selecting further comprises selecting the data records of the subset such that the values of the selected feature of the data records of the subset comprise approximately a given distribution.
8. The method of clause 2, wherein the data records of the reduced training data and the further batch each comprise values of several features, the selecting comprising defining a quantile for values of a selected feature of the features and selecting the data records of the subset dependent on the quantile.
9. The method of clause 1, wherein the repeating of the generating of the updated version of the reduced training data further comprises:
    computing a metadata of the updated version of the reduced training data, wherein the providing of the updated version of the reduced training data comprises providing the metadata of the updated version of the reduced training data, wherein the metadata is usable for generating the ML-model, wherein the generating of the ML-model further comprises a preprocessing of the data records of the updated version of the reduced training data and the training of the ML-model.
10. The method of clause 9, wherein the computing of the metadata of the updated version of the reduced training data further comprises:
    computing a metadata of the further batch;
    performing a comparison of the metadata of the further batch and the metadata of the updated version of the reduced training data of a preceding repetition of the generating of the updated version of the reduced training data; and
    determining the metadata of the updated version of the reduced training data dependent on the comparison.
11. The method of clause 9 or 10, wherein the metadata comprises a total number of data records of the updated version of the reduced training data.
12. The method of clause 9 or 10, wherein the data records of the reduced training data and the further batch each comprise values of several features and the metadata comprises a total number of the features.
13. The method of clause 9 or 10, wherein the data records of the reduced training data and the further batch each comprise values of several features and the metadata comprises an information about a respective type of respective features.
14. The method of clause 9 or 10, wherein the data records of the reduced training data and the further batch each comprise elements for storing values, the method further comprising detecting empty elements of the data records of the reduced training data and the further batch, wherein the metadata comprises an information about the empty elements.
15. The method of clause 9 or 10, wherein the data records of the reduced training data and the further batch each comprise values of several features and the metadata comprises an information about a value of one of the features being constant in the data records of the reduced training data and the further batch.
16. The method of clause 9 or 10, further comprising:
    detecting one of the data records of the reduced training data and the further batch as an outlier, wherein the metadata comprises information about the outlier.
17. The method of clause 9 or 10, wherein the data records of the reduced training data and the further batch each comprise values of several features, the method further comprising:
    detecting a monotonic behavior of a value of one feature of the several features, wherein the metadata comprises information about the monotonic behavior.
18. The method of clause 1, further comprising:
    providing the further batch in multiple chunks of data records of the original training data.
19. A computer program product for providing reduced training data for training a machine learning model (ML-model), comprising:
    one or more computer-readable storage media and program instructions collectively stored on the one or more computer-readable storage media, the program instructions executable by a processor to cause the processor to perform a method comprising:
    reading a first batch of data records and a second batch of data records of an original training data;
    generating a reduced training data for training a machine learning model (ML-model) using a computing device, wherein the computing device comprises a limited storage capacity for storing the reduced training data, and wherein the reduced training data is dependent at least on the first batch and the second batch of the data records of the original training data;
    reading a further batch of the data records of the original training data;
    generating an updated version of the reduced training data dependent on the reduced training data and the further batch, wherein a size of the updated version of the reduced training data is less than a size of the limited storage capacity of the computing device and less than a combined size of the reduced training data and the further batch;
    repeating the reading on another further batch of the data records of the original training data;
    repeating the generating of the updated version of the reduced training data based on the another further batch of the data records of the original training data; and
    providing the updated version of the reduced training data for the training of the ML-model, wherein the size of the updated version of the reduced training data is smaller than a size of the original training data.
20. A computer system for providing reduced training data for training a machine learning model (ML-model), comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

reading a first batch of data records and a second batch of data records of an original training data;

generating a reduced training data for training a machine learning model (ML-model) using a computing device, wherein the computing device comprises a limited storage capacity for storing the reduced training data, and wherein the reduced training data is dependent at least on the first batch and the second batch of the data records of the original training data;

reading a further batch of the data records of the original training data;

generating an updated version of the reduced training data dependent on the reduced training data and the further batch, wherein a size of the updated version of the reduced training data is less than a size of the limited storage capacity of the computing device and less than a combined size of the reduced training data and the further batch;

repeating the reading on another further batch of the data records of the original training data;

repeating the generating of the updated version of the reduced training data based on the another further batch of the data records of the original training data; and providing the updated version of the reduced training data for the training of the ML-model, wherein the size of the updated version of the reduced training data is smaller than a size of the original training data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Improvements and modifications can be made to the foregoing without departing from the scope of the present invention.

The invention claimed is:

1. A computer-implemented method, comprising:

reading a first batch of data records and a second batch of data records of an original training data;

generating a reduced training data for training a machine learning model (ML-model) using a computing device, wherein the computing device comprises a limited storage capacity for storing the reduced training data, and wherein the reduced training data is dependent at least on the first batch and the second batch of the data records of the original training data;

reading a further batch of the data records of the original training data;

generating an updated version of the reduced training data dependent on the reduced training data and the further batch, wherein a size of the updated version of the reduced training data is less than a size of the limited storage capacity of the computing device and less than a combined size of the reduced training data and the further batch;

repeating the reading on another further batch of the data records of the original training data;

repeating the generating of the updated version of the reduced training data based on the another further batch of the data records of the original training data; and providing the updated version of the reduced training data for the training of the ML-model, wherein the size of the updated version of the reduced training data is smaller than a size of the original training data.

2. The method of claim 1, wherein the generating of the updated version of the reduced training data further comprises: selecting a subset of the data records of the reduced training data and the further batch, wherein the subset of the data records form the data records of the updated version of the reduced training data.

3. The method of claim 2, further comprising:

randomly selecting the subset from the data records of the reduced training data and the further batch.

4. The method of claim 2, further comprising:

dividing the data records of the reduced training data and the further batch into a plurality of subgroups; and selecting a respective number of data records from each subgroup of the plurality of subgroups.

5. The method of claim 4, wherein the selecting further comprises:

adapting the respective number of the selected data records of a respective subgroup to a respective size of the respective subgroup.

6. The method of claim 4, wherein the plurality of subgroups each comprise a respective relevance and the selecting further comprises: adapting the respective number of the selected data records of the respective subgroup to the respective relevance of the respective subgroup.

7. The method of claim 2, wherein the data records of the reduced training data and the further batch each comprise values of several features, wherein one of the several features is a selected feature, wherein the selecting further comprises selecting the data records of the subset such that the values of the selected feature of the data records of the subset comprise approximately a given distribution.

8. The method of claim 2, wherein the data records of the reduced training data and the further batch each comprise values of several features, the selecting comprising defining a quantile for values of a selected feature of the features and selecting the data records of the subset dependent on the quantile.

9. The method of claim 1, wherein the repeating of the generating of the updated version of the reduced training data further comprises:

computing a metadata of the updated version of the reduced training data, wherein the providing of the updated version of the reduced training data comprises providing the metadata of the updated version of the reduced training data, wherein the metadata is usable for generating the ML-model, wherein the generating of the ML-model further comprises a preprocessing of the data records of the updated version of the reduced training data and the training of the ML-model.

10. The method of claim 9, wherein the computing of the metadata of the updated version of the reduced training data further comprises:

computing a metadata of the further batch;

performing a comparison of the metadata of the further batch and the metadata of the updated version of the reduced training data of a preceding repetition of the generating of the updated version of the reduced training data; and determining the metadata of the updated version of the reduced training data dependent on the comparison.

11. The method of claim 9, wherein the metadata comprises a total number of data records of the updated version of the reduced training data.

12. The method of claim 9, wherein the data records of the reduced training data and the further batch each comprise values of several features and the metadata comprises a total number of the features.

13. The method of claim 9, wherein the data records of the reduced training data and the further batch each comprise values of several features and the metadata comprises an information about a respective type of respective features.

14. The method of claim 9, wherein the data records of the reduced training data and the further batch each comprise elements for storing values, the method further comprising detecting empty elements of the data records of the reduced training data and the further batch, wherein the metadata comprises an information about the empty elements.

15. The method of claim 9, wherein the data records of the reduced training data and the further batch each comprise values of several features and the metadata comprises an information about a value of one of the features being constant in the data records of the reduced training data and the further batch.

16. The method of claim 9, further comprising:
detecting one of the data records of the reduced training data and the further batch as an outlier, wherein the metadata comprises information about the outlier.

17. The method of claim 9, wherein the data records of the reduced training data and the further batch each comprise values of several features, the method further comprising:
detecting a monotonic behavior of a value of one feature of the several features, wherein the metadata comprises information about the monotonic behavior.

18. The method of claim 1, further comprising:
providing the further batch in multiple chunks of data records of the original training data.

19. A computer program product for providing reduced training data for training a machine learning model (ML-model), comprising:
one or more computer-readable storage media and program instructions collectively stored on the one or more computer-readable storage media, the program instructions executable by a processor to cause the processor to perform a method comprising:
reading a first batch of data records and a second batch of data records of an original training data;
generating a reduced training data for training a machine learning model (ML-model) using a computing device, wherein the computing device comprises a limited storage capacity for storing the reduced training data, and wherein the reduced training data is dependent at least on the first batch and the second batch of the data records of the original training data;
reading a further batch of the data records of the original training data;
generating an updated version of the reduced training data dependent on the reduced training data and the further batch, wherein a size of the updated version of the reduced training data is less than a size of the limited storage capacity of the computing device and less than a combined size of the reduced training data and the further batch;
repeating the reading on another further batch of the data records of the original training data;
repeating the generating of the updated version of the reduced training data based on the another further batch of the data records of the original training data; and
providing the updated version of the reduced training data for the training of the ML-model, wherein the size of the updated version of the reduced training data is smaller than a size of the original training data.

20. A computer system for providing reduced training data for training a machine learning model (ML-model), comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
reading a first batch of data records and a second batch of data records of an original training data;
generating a reduced training data for training a machine learning model (ML-model) using a computing device, wherein the computing device comprises a limited storage capacity for storing the reduced training data, and wherein the reduced training data is dependent at least on the first batch and the second batch of the data records of the original training data;
reading a further batch of the data records of the original training data;
generating an updated version of the reduced training data dependent on the reduced training data and the further batch, wherein a size of the updated version of the reduced training data is less than a size of the limited storage capacity of the computing device and less than a combined size of the reduced training data and the further batch;
repeating the reading on another further batch of the data records of the original training data;
repeating the generating of the updated version of the reduced training data based on the another further batch of the data records of the original training data; and
providing the updated version of the reduced training data for the training of the ML-model, wherein the size of the updated version of the reduced training data is smaller than a size of the original training data.

* * * * *